May 16, 1950     F. M. CLARK     2,508,099
DIELECTRIC COMPOSITION
Filed July 24, 1946
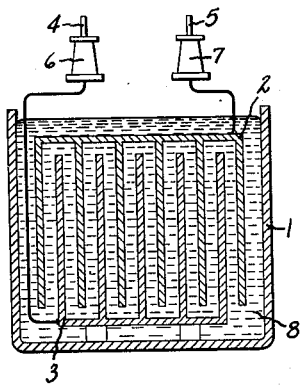
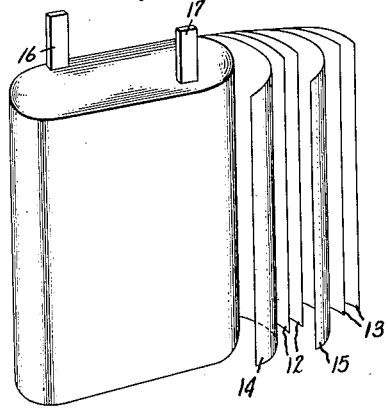
Capacitors Containing Stilbene Dielectric
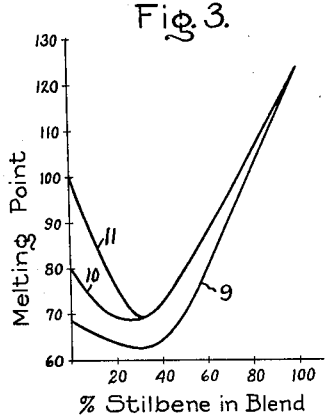
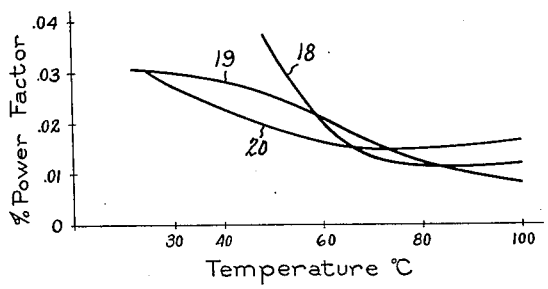
Inventor:
Frank M. Clark,
by Harry E. Dunham
His Attorney.

Patented May 16, 1950

2,508,099

UNITED STATES PATENT OFFICE 2,508,099

DIELECTRIC COMPOSITION

Frank M. Clark, Pittsfield, Mass., assignor to General Electric Company, a corporation of New York Application July 24, 1946, Serial No. 685,940

1 Claim. (Cl. 252—63)

The present invention relates to electric capacitors and comprises dielectric materials which have electrical properties adapting them particularly for the high frequency field.

The novel feature of such electric capacitors is a dielectric element consisting wholly or largely of an organic compound known as stilbene, which has the chemical formula $C_6H_5CH=CHC_6H_5$. The stilbene preferred for this purpose is the so-called "trans" isomer, which is a waxy solid compound having a melting point of 124° C.

The accompanying drawing shows in Fig. 1 somewhat conventionally a capacitor adapted for high frequency operation in which the armatures are separated from one another solely by spacers of stilbene; Fig. 2 shows conventionally a paper-spaced type of capacitor which is impregnated with stilbene dielectric material; Fig. 3 is a graph of melting points of different compositions containing stilbene and Fig. 4 is a graph of power factor characteristics over a range of operating temperatures of stilbene unassociated with any modifying component.

Electric capacitors for use in the high frequency field of application require for satisfactory operation a dielectric material which renders the capacitor capable of operation with low energy loss. In power circuits such as that of the electronic heater which is used for induction heating purposes a low loss characteristic is necessary in order that the apparatus may oscillate satisfactorily and deliver its rated load. In addition a low loss capacitor dielectric is necessary in order to avoid heat accumulation and eliminate overheating and destruction of the dielectric. For example, in 60 cycle power applications, the smallest type of commercial capacitor for 2300 volt (A. C.), application is characterized by 46.3 cubic inch of capacitor volume per kva. However, in the high frequency applications it is desired for reasons of economic construction that the capacitor shall possess a capacitor volume as small as about .8 to 1 cubic inch per kva. Such a high ratio of electrical capacity per unit of capacitor volume demands a capacitor dielectric having a power factor of less than .1% in order to obtain efficient operation of the electronic heater and a capacitor operation free from the danger of overheating and failure in service.

Furthermore, for some applications, as for example in radio broadcasting transmitter circuits, the dielectric constant of the capacitor dielectric, to which the electrical capacity of the capacitor is related, must be substantially unaffected by wide variations in temperature in order to preclude uncontrolled changes in frequency.

For some types of service, especially where small electrical capacities or low voltage, applications are involved, it is impractical to utilize a liquid dielectric in capacitors. Because of the hazard of leakage it is required that the dielectric shall be solid in nature and possess a melting point higher than the maximum temperature which will be met in practice, most commonly a temperature as high as about 100° C. or even higher. Not many solid dielectrics are available for such service.

I have discovered that stilbene, and in particular, the trans isomer of stilbene which has a melting point of 124° C. possesses the combination of physical properties, and especially dielectric properties, which render electric capacitors containing this compound as dielectric especially well adapted for operation both in high and low frequency A. C. circuits and also direct current circuits when for any reason a solid dielectric is desired.

I have discovered also that a liquid composition which consists preponderately or solely of stilbene has unexpected advantages as a dielectric element.

When the impressed alternating voltage to which capacitors embodying the present invention are subjected exceeds about 300 volts, regardless of the frequency, it is advantageous to employ therein a liquid dielectric element. I may employ the "cis" isomer of stilbene which normally is in the liquid state at ordinary temperatures or preferably a liquid composition of either the cis or the trans isomer of stilbene and other components whereby liquidity is imparted in a working range of temperatures.

The capacitor, as conventionally shown in Fig. 1 comprises a casing 1 in which are mounted closely spaced sets of armatures 2, 3 which are supported from a cover plate (not shown). The armatures may be maintained in proper operative relation by spacers (not shown) consisting of suitable insulating material. The respective spaced sets of capacitor plates are connected respectively to external terminals 4, 5 which are provided with suitable insulators 6, 7. The spaces between the two sets of armatures are filled with the solid form of stilbene, or with a liquid composition to be described. The interjacent dielectric element which is shown at 8 (of exaggerated thickness) consists of solid or liquid stilbene composition.

Stilbene although possessing excellent electrical characteristics, as described is difficult to handle in factory operations because of its high melting point which necessitates that it should be pumped and generally handled at an elevated temperature, ordinarily in the range of 125 to 150° C. in order to maintain it in the liquid state. Such a high temperature of handling compels the use of piping and other accessory equipment which is heated at least to the same high temperatures and frequently to temperatures as high as 160 to 170° C. in order to prevent solidification and plugging of the pumping and piping system.

Changes from liquid to solid state of dielectric element or vice versa result in the formation of unfavorable gas pockets. The gas pocket formation is attributable to the evolution of dissolved gas upon solidification of the liquid. Voids may be formed by the physical contraction during cooling of the solid which is formed. Gas pockets and voids lead to ionization and consequent electric breakdown.

These objectionable practical difficulties can be overcome by means of suitable selected blends of stilbene and aromatic hydrocarbons of the condensed or polynuclear type. I have found that compositions which incorporate stilbene and diphenyl or naphthalene or anthracene or phenanthrene and the like possess suitable low melting points which may be even lower than either constituent of the composition. In Fig. 3 I have shown by graphs the melting point of compositions of stilbene and modifiers consisting respectively of diphenyl (graph 9), naphthalene (graph 10), and phenanthrene (graph 11), such compounds being selected as representative of suitable polynuclear and condensed aromatic hydrocarbons. As part of graphs 10 and 11 would fall too closely together to be shown distinct from one another they have been shown as coincident.

For applications where the capacitor is not intended to operate at temperatures about 60° C. I prefer to use compositions having a relatively low melting point. Such compositions may consist of the following combinations, by weight:

| Components | Melting Point |
|---|---|
|  | °C. |
| 30% Stilbene, 70% naphthalene | 68 |
| 30% Stilbene, 70% diphenyl | 63 |
| 30% Stilbene, 70% phenanthrene | 69 |

If the capacitor is intended for higher temperature of application, I prefer to use a stilbene blend which possesses a melting point of about 10° C. higher than the expected operating temperature.

| Expected Maximum Operating Temperature | Stilbene Composition To Be Used | Melting Point of the Composition used |
|---|---|---|
| °C. |  | °C. |
| 75 | stilbene 65%, diphenyl 35% | 85 |
|  | stilbene 58%, naphthalene 42% | 85 |
|  | stilbene 58%, phenanthrene 42% | 85 |
| 100 | stilbene 88%, diphenyl 12% | 110 |
|  | stilbene 85%, naphthalene 15% | 110 |
|  | stilbene 85%, phenanthrene 15% | 110 |

The electrical and physical characteristics of these blends render them suitable as capacitor impregnants as described. The dielectric characteristics of such compositions partake of the advantages of stilbene when unassociated with a modifier.

I have further now found that mixtures containing several polynuclear and condensed nuclei as well as stilbene give further reductions in the melting point.

If a liquid dielectric composition is desired it may consist up to the extent of about 60 to 75% of stilbene, the remainder preferably consisting of one or more aromatic hydrocarbons of the condensed or polynuclear type, such as for example, phenanthrene, naphthalene, anthracene, diphenyl, methylnaphthalene and dibenzyl. The proportions of the components of such a liquid composition may be widely varied, for example, a composition may be made up of the following components and of the ratio of parts in the ranges indicated:

| | Per cent by weight |
|---|---|
| Stilbene | 60 to 75 |
| Diphenyl | 5 to 20 |
| Anthracene | 5 to 20 |
| Phenanthrene | 5 to 20 |
| Naphthalene | 2 to 10 |
| Methylnaphthalene | 0 to 15 |
| Dibenzyl | 5 to 15 |

The following specific liquid composition designated as Composition A has been found to be satisfactory for dielectric use in electric capacitors:

| | Per cent by weight |
|---|---|
| Stilbene | 63 |
| Diphenyl | 7 |
| Naphthalene | 5 |
| Methylnaphthalene | 7 |
| Dibenzyl | 6 |
| Phenanthrene | 12 |

The latter composition is a neutral liquid having a viscosity at 100° F. (37.8° C.) of 40 to 50 seconds Saybolt Universal. It has a pour point of −20 to −25° C., has a yellow color, a specific gravity of 1.03 to 1.05 and a refractive index at 25° C. of 1.62. It is non-oxidizing and for this reason alone has an advantage over mineral oil as an impregnant. Its dielectric constant is somewhat above that of mineral oil.

A liquid comprising stilbene which is suitable for functioning as the sole dielectric between parallel spaced armatures of capacitors of the construction shown in Fig. 1, may be used as an impregnant for paper-spaced capacitors. Fig. 2 shows a capacitor of the rolled type in which a plurality of sheets of paper 12, 13 are used as spacers between flexible strip armatures 14, 15. Terminals 16, 17 are provided and the assembly is housed in a casing (not shown). The impregnation is carried out by well known procedure.

A capacitor having a construction such as shown in Fig. 1 in which the unobstructed spaces between the armatures are filled with the solid form of stilbene or stilbene composition containing diphenyl, naphthalene, phenanthrene and the like operates with high frequency excitation with power factors less than a tenth of one per cent. The graph of Fig. 4 exemplifies some of these conditions, the vertical coordinates being plotted in per cent power factor and the horizontal axis a temperature range. Graph 18 shows the power factor characteristic for 550 kilocycles of alternating electric field. At an operating temperature of 45° C. the power factor is about 0.035% and drops rapidly when the operating temperature becomes as high as about 75° C. From 75° to 100° C., the power factor is substantially constant.

At higher frequencies the power factor is lower in the higher temperature ranges. As shown by graph 19 the power factor at room temperature (30° C.) for impressed frequencies of 800 kilocycles is about 0.03 per cent, also decreasing at higher temperatures. Graph 20 shows the power factor at 1000 kilocycles impressed frequency. The power factor at room temperature is less than 0.03 per cent and is lower at higher temperatures.

The power factor of the present dielectric composition is low over a wide range of frequency in an elevated temperature range of commercial use, say, 75 to 100° C. Over this temperature range the power factor is a minimum for all frequencies of application illustrated. This assures the efficient operation of the new dielectric even under wide frequency variation and eliminates the hazard of excessive heat generation and accumulation which is normally characteristic of a dielectric in this range of temperature use. At a frequency of 1000 kilocycles (graph 20), which is a common commercial frequency, the power factor at elevated operating temperatures is approximately 0.015 per cent.

Conventional paper-spaced capacitor designed for use in standard 60 cycle circuits advantageously may be impregnated with the described liquid compositions of stilbene. Capacitors containing three sheets of .0004" kraft paper treated with composition A have a power factor of about .4% at room temperature. The power factor increases slowly with rise of temperature to about .7% at 100° C.

What I claim as new and desire to secure by Letters Patent of the United States is:

A liquid dielectric composition consisting, by weight, of 60 to 75 per cent stilbene, 5 to 20 per cent diphenyl, 5 to 20 per cent anthracene, 5 to 20 per cent phenanthrene, 2 to 10 per cent naphthalene, up to 15 per cent methylnaphthalene and 5 to 15 per cent dibenzyl.

FRANK M. CLARK.

REFERENCES CITED

The following references are of record in the file of this patent:

UNITED STATES PATENTS

| Number | Name | Date |
|---|---|---|
| 2,154,138 | Rost | Apr. 11, 1939 |
| 2,340,644 | Clark | Feb. 1, 1944 |
| 2,361,044 | Mattox | Oct. 24, 1944 |

OTHER REFERENCES

Dielectric Constant and Molecular Structure, 1931, pp. 197, 198 and 204, C. P. Smyth, Chem. Catalogue Co., New York, N. Y.